United States Patent
Sato (10) Patent No.: US 6,906,504 B2
(45) Date of Patent: *Jun. 14, 2005

(54) VOLTAGE BOOSTER CIRCUIT AND SEMICONDUCTOR DEVICE FOR INCORPORATING SAME

(75) Inventor: Hisatake Sato, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/619,585

(22) Filed: Jul. 16, 2003

(65) Prior Publication Data

US 2004/0012378 A1 Jan. 22, 2004

Related U.S. Application Data

(63) Continuation of application No. 10/017,414, filed on Dec. 18, 2001, now Pat. No. 6,605,932.

(30) Foreign Application Priority Data

Jun. 12, 2001 (JP) ........................................ 2001-177478

(51) Int. Cl.⁷ ................................................ G05F 3/16
(52) U.S. Cl. ...................... 323/313; 323/317; 327/536; 327/537; 363/60
(58) Field of Search ...................... 363/59, 60; 327/536, 327/537; 307/110; 323/311, 313, 315, 317, 350

(56) References Cited

U.S. PATENT DOCUMENTS

| 6,107,764 A | | 8/2000 | Blackburn |
| 6,107,864 A | * | 8/2000 | Fukushima et al. ......... 327/536 |
| 6,191,963 B1 | | 2/2001 | McPartland et al. |
| 6,373,322 B2 | | 4/2002 | Kobayashi et al. |
| 6,414,862 B1 | | 7/2002 | Ogura |
| 6,459,330 B2 | * | 10/2002 | Yasue ......................... 327/538 |

FOREIGN PATENT DOCUMENTS

JP         57021937         2/1982

* cited by examiner

Primary Examiner—Gary L. Laxton
(74) Attorney, Agent, or Firm—Volentine Francos & Whitt, PLLC (57) ABSTRACT

A boost voltage circuit includes a plurality of N channel type MOS transistors connected between an input terminal and an output terminal in series, wherein one electrode of each of the N channel type MOS transistors is connected to each of external terminals to which a capacitor can be connected to generate a boost voltage. A plurality of P channel type MOS transistors are respectively connected to each of the N channel type MOS transistors in parallel. Thereby, a boost voltage circuit with improved stability is provided so that the boost voltage circuit is started without increase of consumption current.

7 Claims, 5 Drawing Sheets

VOLTAGE BOOSTER CIRCUIT AND SEMICONDUCTOR DEVICE FOR INCORPORATING SAME

CROSS-REFERENCE TO RELATED APPLICATIONS

This is a continuation of application Ser. No. 10/017,414, filed Dec. 18, 2001, now U.S. Pat. No. 6,605,932 which is hereby incorporated herein by reference in its entirety for all purposes.

BACKGROUND OF THE INVENTION

1. Field of the Invention

The present invention relates to a voltage booster circuit. More particularly, the present invention relates to a voltage booster circuit increasing an input voltage by using charge/discharge of a capacitor to generate a desired boost voltage and a semiconductor device for incorporating the voltage booster circuit.

2. Description of the Related Art

To accomplish a lower voltage of a voltage source or a lower current consumption, various semiconductor devices in which a voltage booster circuit is incorporated is becoming increased. The voltage booster circuit boosts a source voltage or an internal source voltage which is generated from the source voltage and lower than the source voltage, and generates the source voltage or a boosted voltage higher than the internal source voltage.

In particular, it is required to provide a voltage booster circuit as a power supply to liquid crystals in the semiconductor device for a liquid crystal display using various kinds of voltages.

As a conventional voltage booster circuit, for example, there is a circuit to boost a source voltage or an internal source voltage by utilizing the charge/discharge of a capacitor.

The voltage booster circuit as mentioned above connects, for example, a plurality of N channel MOS transistors in series between an input terminal and an output terminal of the booster circuit and a capacitor is connected to a connecting point of each of the N channel MOS transistors. According to a voltage level of a signal 0, the conductive state in N channel transistors of even number and odd number connected in series is alternately controlled, and at the same time the charge and discharge of the capacitor is alternately controlled. By repeating this cycle, the voltage is boosted stepwise and thereby a desired boosted voltage is obtained as an output voltage.

However, when the voltage booster circuit is constituted as mentioned above, there is a possibility that an initial status of the voltage booster circuit is not stable at an initial operation stage, i.e., after a power supply is turned on. This is because that since the boosted voltage generated by the voltage booster circuit is used as a voltage which is supplied to each of the transistors which constitute the voltage booster circuit it may happen sometimes that this boosted voltage is not supplied to each transistor and thereby, the voltage booster circuit is not activated. This is because the N channel MOS transistors are connected in series and any of the N channel MOS transistors is non conductive state right after the power is turned on. Therefore, this voltage may not be transmitted to an output terminal even if an input voltage is applied to an input terminal.

As a solution of such a drawback, a transistor of depression type is used for the N channel MOS transistors. However, a step for producing the depression typed transistor needs to be added in the process of manufacturing the semiconductor device and, therefore, the cost for manufacturing the semiconductor device is increased. Further, the transistor of the depression type is always conductive state, and loss for a boosted voltage level occurs or the current consumption is increased.

In addition, in recent years, it is required that users can set a voltage to the desired boosted voltage. Though the voltage can be set to a desired value by coupling a capacitor to an outside of the circuit, care for a wire is becoming necessary so that the capacitor can easily be coupled.

SUMMARY OF THE INVENTION

Therefore, it is an object of the present invention to provide a voltage booster circuit to improve the stability in activating the voltage booster circuit without an increase of the current consumption.

Further, it is another object of the present invention to realize the voltage booster circuit with suppressing an increase of the manufacturing cost as much as possible.

Furthermore, it is still another object of the present invention to provide a semiconductor device capable of obtaining any desired boosted voltage without increasing largely the manufacturing cost by using a semiconductor device which incorporates therein the voltage booster circuit of the present invention.

A voltage booster circuit which boosts an input voltage by using a capacitor and to generate a boosted voltage which is higher than the boosted input voltage, includes: an input terminal for applying the input voltage; an output terminal for outputting the boosted voltage; n number of N channel transistors connected in series between the input terminal and the output terminal (n is an integer equal to or greater than 2); n number of first P channel transistors connecting in parallel with the N channel transistors; a plurality of terminals for capacitor connections respectively connecting to one electrode of each of the N channel transistor and one electrode of each of the first P channel transistor corresponding to the N channel transistor and connecting to a capacitor in accordance with a desired boosted voltage; and a controlling circuit for outputting a controlling signal corresponding to each gate electrode of the plurality of N channel transistors and each gate electrode of the plurality of the first P channel transistors.

The voltage booster circuit constituted as described above can transmit the. input voltage from the input terminal via the first P channel MOS transistor to an output terminal and, therefore, a necessary voltage for activating the circuit can be supplied to each transistor which constitute the voltage booster circuit. Therefore, the voltage booster circuit of the present invention can improve the stability in activating the voltage booster circuit.

The voltage booster circuit of the present invention can select any boosted voltage levels or the booster circuit may be made in an inactive state by adding various artifices.

The voltage booster circuit adding such various artifices can easily set the boosted voltage level or can realize a lower current consumption.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on preferred embodiments, which do not intend to limit the scope of the present invention, but rather to exemplify the invention. All of the features and the combinations thereof described in the embodiments are not necessarily essential to the invention.

(First Embodiment)

Below, a voltage booster circuit according to a first embodiment will be described with reference to accompanying drawings.

Figure 1:
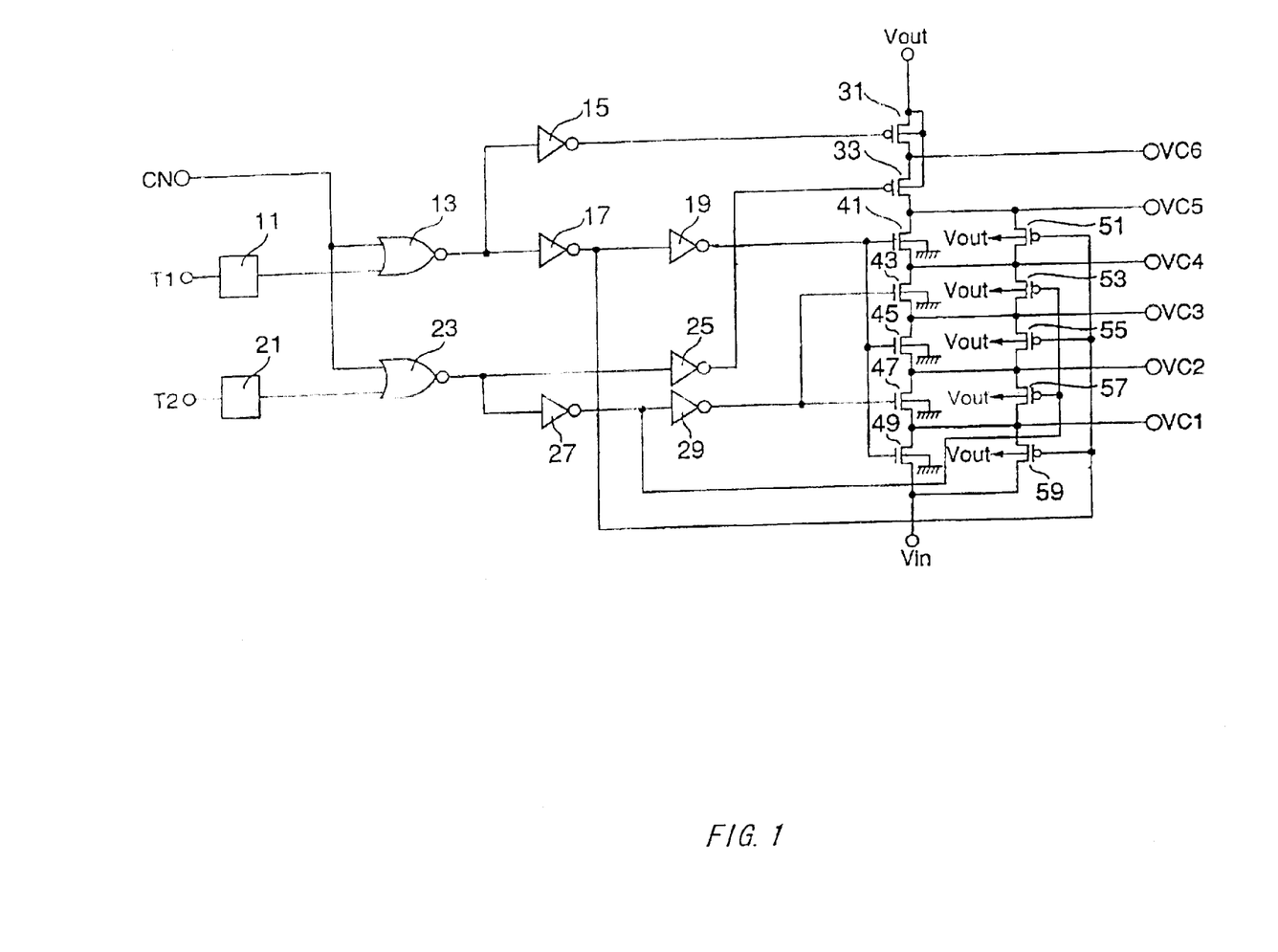
FIG. 1 is a circuit diagram shoring a voltage booster circuit according to a first embodiment of the present invention.

FIG. 1 is a circuit diagram showing the voltage booster circuit according to the first embodiment.

In FIG. 1, the voltage booster circuit includes two level shift circuits 11 and 21, two NOR gates 13 and 23, six inverters 15, 17, 19, 25, 27 and 29, five N channel MOS transistors (hereinafter, referred to as NMOS) 41, 43, 45, 47, and 49 and seven P channel MOS transistors (hereinafter, referred to as PMOS) 31, 33, 51, 53, 55, 57, and 59.

The NMOS transistors 41, 43, 45, 47, and 49, and the PMOS transistors 31 and 33 are connected between an input terminal Vin and an output termimal Vout in series. An input voltage is applied to the input terminal Vin. The output terminal Vout outputs a boosted voltage. The PMOS transistors 31 and 33 are positioned on the output terminal side as gate circuits. A substrate voltage of each NMOS is set to a reference voltage, i.e., a ground voltage according to the present embodiment. Each substrate voltage of PMOS transistors 31 and 33 is set to the boosted voltage output from the output terminal Vout.

The PMOS transistors 51, 53, 55, 57, and 59 are connected to the corresponding NMOS transistors 41, 43, 45, 47, and 49, respectively, in parallel with each other. The substrate voltage of each PMOS transistor 51, 53, 55, 57 and 59 is also set to the boosted voltage output from the output terminal Vout.

Each of level shift circuits 11 and 21 shifts a voltage level on a high voltage side of each of driving signals T1 and T2 transmitted between a source voltage level (or internal source voltage level) and a ground voltage level, from the voltage level (or internal voltage level) to the boosted voltage level. The driving signals T1 and T2 slightly have a time when voltage levels are the same in the present embodiment, however, these signals are signals which have a complementary voltage level.

Output signals from the level shift circuits 11 and 21 are respectively input to one input terminal of the NOR gate 13 and one input terminal in the NOR gate 23. An activation signal CN to control activation of the voltage booster circuit is input to the other input terminal in the NOR gate 13 and the other input terminal of the NOR gate 23. Each output signal from the NOR gates 13 and 23 is supplied to each PMOS gate electrode or each NMOS gate electrode via respective inverter. A voltage can be fixed to a low voltage level (hereinafter, referred to as L level) by raising a voltage of the activation signal CN to a high voltage level (hereinafter, referred to as H level). This allows both each NMOS and PMOS to be kept in a non-conductive state. When the activation signal CN is at an L level, each of NOR gates 13 and 23 outputs a signal of a voltage level according to the voltage level of the output signal from each of the level shift circuits 11 and 21. The NOR gates 13 and 23 act as activation circuits to control the activation of the voltage booster circuits.

The output signal of the NOR gate 13 is supplied to the gate electrode of the PMOS 31 via the inverter 15 and to each gate electrode of the PMOS transistors 51, 55, and 59 via the inverter 17. Further, the output signal of the NOR gate 13 is supplied to each gate electrode of the NMOS transistors 41, 45, and 49 via the inverters 17 and 19.

The output signal of the NOR gate 23 is supplied to the gate electrode of the PMOS 33 via the inverter 25 and to each gate of the PMOS transistors 53 and 57 via the inverter 27. Further, the output signal of the NOR gate 23 is supplied to each gate electrode of the NMOS transistors 43 and 47 via the inverters 27 and 29.

As aforementioned, the driving signals T1 and T2 are the signals having the complementary voltage level. Therefore, when the activation signal CN is the L level, the driving signals T1 is the H level and the driving signals T2 is the L level, each of the PMOS transistors 31, 51, 55, 59, 41, 45 and 49 to which the signal from the NOR gate 13 is supplied becomes in the non-conductive state. Each of the PMOS transistors 33, 53, 57, the NMOS transistors 43 and 47 becomes in a conductive state. In contrast, when the driving signal T1 is the L level and the driving signal T2 is the H level, each of the PMOS transistors 31, 51, 55, 59, the NMOS transistors 41, 45 and 49 to which the signal from the NOR gate 13 is supplied becomes in the conductive state, whereas each of the PMOS transistors 33, 53, 57, NMOS transistors 43 and 47 becomes in the non-conductive state.

A boosted voltage from an output terminal Vout is supplied to each of the inverters 15, 17, 19, 27, 25, 29, the NOR gates 13, and 23. Any of the high voltage levels of the output signals from the inverters and the NOR gates are levels in which the boost voltage from the output terminal Vout is used.

A control circuit, which controls the conductive state of each transistor by a control signal, which is the output signal from each inverter, comprises the NOR gates and the inverters. Each of terminals VC1 to VC5 for capacitor connections is connected to one electrode in each of the NMOS transistors 41, 43, 45, 47 and 49, and to one electrode in each of the PMOS transistors 51, 53, 55, 57 and 59. A terminal VC6 for the capacitor connection is connected to a connection between the PMOS 31 and the PMOS 33.

These terminals VC1 to VC6 are used as external terminals of a semiconductor device which installs therein the voltage booster circuit so that the capacitor coupled to the outside of the circuit can be connected to the terminals. Relation of the capacitor connection to the boosted voltage will be described hereinbelow.

Figure 3:
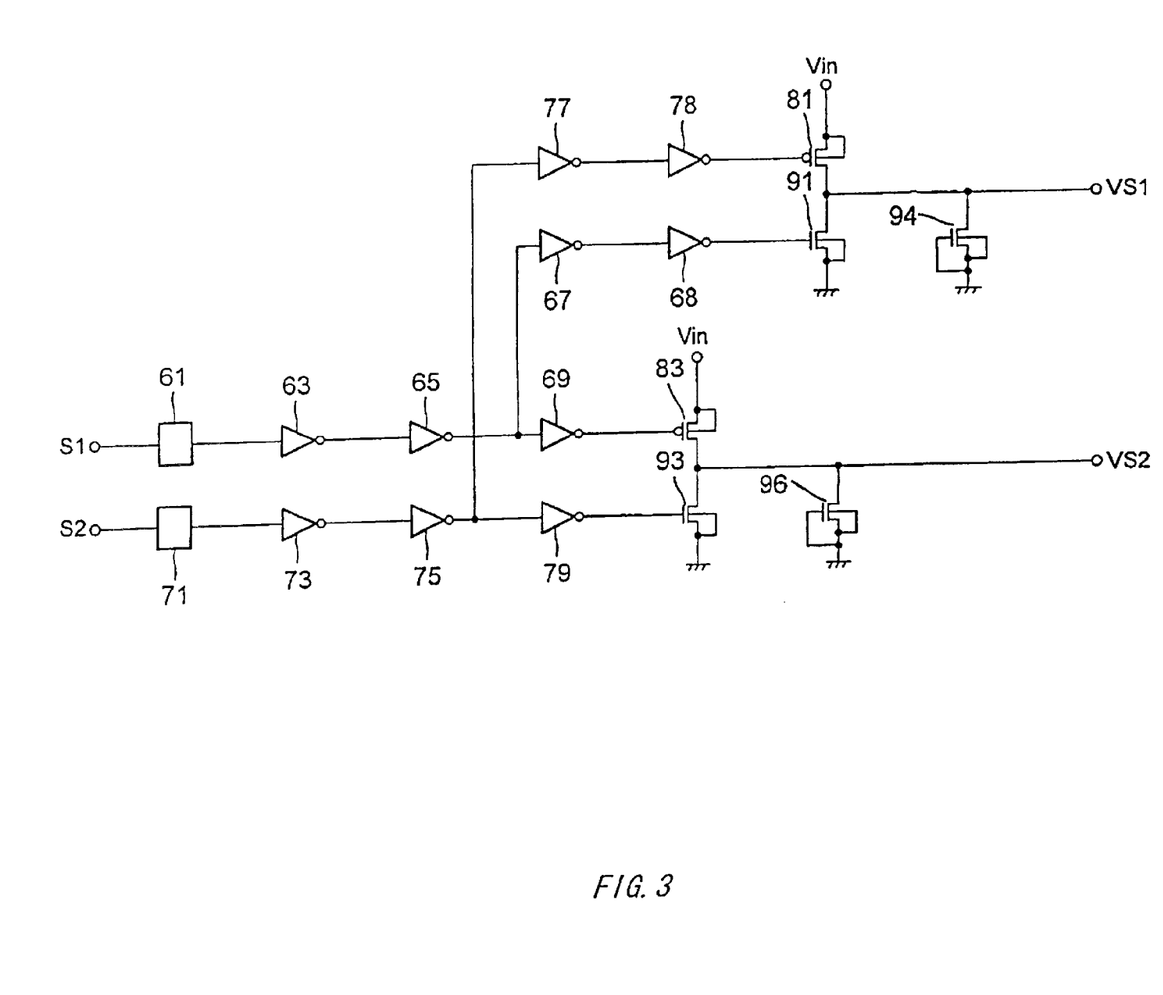
FIG. 3 is a circuit diagram of a voltage supply circuit for supplying a voltage to control charge/discharge of the capacitor coupled to the outside.
Figures 4A, 4B:
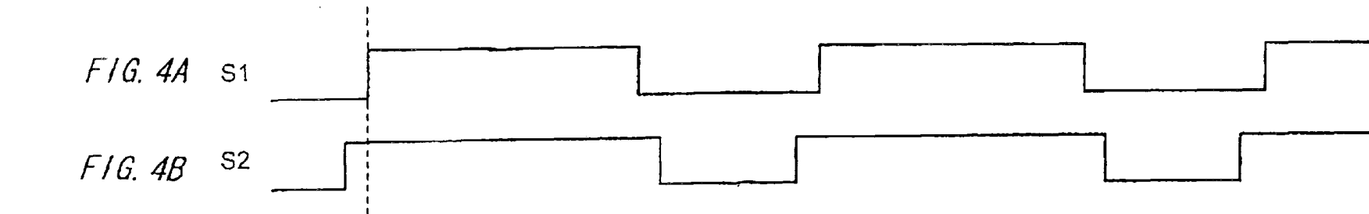
FIGS. 4A, 4B, 4C, and 4D are timing charts showing voltage levels at a time of operation of driving signals T1 and T2, and voltage generation control signals S1 and S2.
Figure 4C:
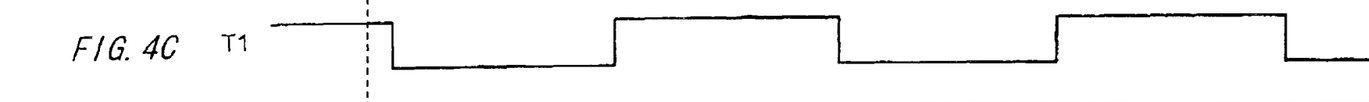
Figure 4D:
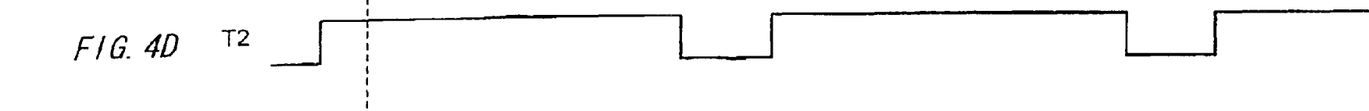

According to the invention, a voltage supplying circuit for supplying a voltage for controlling charge/discharge of the capacitor coupled to the outside of the circuit as shown in FIG. 3 is further provided in the voltage booster circuit.

In FIG. 3, the voltage supplying circuit is comprised of two level shift circuits 61 and 71, ten inverters 63, 65, 67, 68, 69, 73, 75, 77, 78, and 79, an inverter comprising a PMOS 81 and a NMOS 91, an inverter comprising a PMOS 83 and an NMOS 93, NMOS transistors 94 and 96 as a protection circuit for which a diode connection is performed.

Each of level shift circuits 61 and 71 shifts a voltage level on a high voltage side of each of voltage generation controlling signals S1 and S2 transmitted between a voltage source level (or internal voltage level) and a ground voltage level, from the source voltage level (or internal voltage level) to an input voltage level input to an input terminal Vin. The voltage generation controlling signals S1 and S2 have a time when voltage levels are slightly different in the present embodiment, however, the signals are signals having a similar voltage level.

A signal output from the level shift circuit 61 is supplied to a gate electrode of the NMOS 91 via the inverters 63, 65, 67, and 68 and to a gate electrode of the PMOS 83 via the inverters 63, 65, and 69.

A signal output from the level shift circuit 71 is supplied to a gate electrode of the PMOS 81 via the inverters 73, 75, 77, and 78 and to a gate electrode of the NMOS 93 via the inverters 73, 75, and 79.

The PMOS 81 and the NMOS 91, and PMOS 83 and the NMOS 93 are respectively connected in series between terminals set to input voltages and terminals set to the ground voltages from the input terminals Vin.

The input voltage from the input terminal Vin is also supplied to the inverters 63, 65, 67, 68, 69, 73, 75, 77, 78, and 79 and the high voltage level of a signal from the inverters becomes a level according to the input voltage level output from the input terminal Vin.

An output voltage VS1 is output from a connection point of the PMOS 81 and the NMOS 91 and an output voltage VS2 is output from a connection of the PMOS 83 and the NMOS 93. A gate electrode is grounded between each connection and a ground, and the NMOS 94 and the NMOS 96 as the protection circuit for which diode connection is performed, to which a ground voltage is supplied as a substrate voltage, are respectively provided.

In the voltage supplying circuit of FIG. 3, when the voltage generation controlling signals S1 and S2 are the H levels, the PMOS 83 and the NMOS 91 become in the conductive state, and the PMOS 81 and the NMOS 93 become in the non-conductive state. Therefore, the output signal VS1 becomes the L level and the output signal VS2 becomes the H level according the input voltage. In contrast, when the voltage generation controlling signals S1 and S2 are the L levels, the PMOS 83 and the NMOS 91 become in the non-conductive state, and the PMOS 81 and the NMOS 93 become in the conductive state. Therefore, the output signal VS1 becomes the L level according to the input voltage and the output signal VS2 becomes the H level. The output signals VS1 and VS2 can be output from the external terminal to the outside so that the output signals VS1 and VS2 are supplied to the capacitor provided the outside.

An voltage boosting operation of the voltage booster circuit having like the above structure will be described, below. FIGS. 2A to 2F are diagrams showing a connection of the external terminal to the capacitor to obtain the desired boosted voltage by using the capacitor coupled to the outside of the circuit. Each of FIGS. 2A to 2F is diagram showing a connection example to boost a voltage from double to seven times. Each of FIGS. 2A to 2F shows one part of an outer appearance of the semiconductor device and shows the Vin to which the input voltage is supplied, the Vss to which the ground voltage is supplied, and the Vout of the boosted voltage, as its external terminal. Each of FIGS. 2A to 2F shows each terminal of VC1 to VC6 and the terminals for VS1 and VS2.

A power supply is connected to the input terminal Vin, the terminal Vss is grounded, and the capacitor is connected between the terminal Vss and the output terminal Vout with respect to each of boost voltages in all cases of FIGS. 2A to 2F.

Figure 2A:
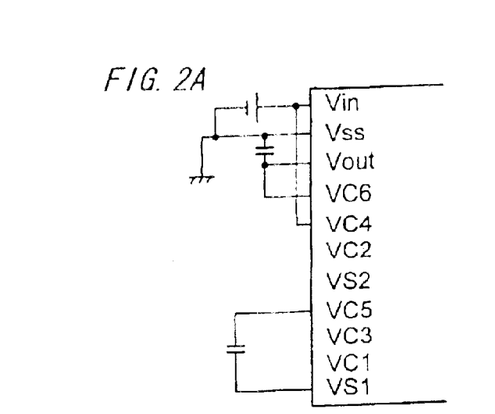
FIGS. 2A, 2B, 2C, 2D, 2E and 2F is a diagram showing a connection of an external terminal to a capacitor to obtain a desired boosted voltage using the capacitor coupled to the outside of the circuit.

In FIG. 2A, the capacitor is coupled to the outside of the circuit between the terminal VC5 and the terminal for the signal VS1 for a double boosted voltage. The input terminal Vin is connected to the terminal VC4. The output terminal Vout is electrically connected to the terminal VC6.

By performing like this connection, since the terminal VC4 Establishes the same function as the input terminal Vin, only the NMOS 41, the PMOS transistors 33 and 51 contributes to the boost operation.

Next, an operation will be described. Each of FIGS. 4A to 4D shows a timing chart showing the voltage level in operation of the driving signals T1 and T2, and voltage generation controlling signals S1 and S2. The timing chart shown in the drawings is the same as a timing chart in generation of the boosted voltage with another multiple-times boosted voltage described later. Incidentally, the voltage level of the activation signal CN is set to L level, here.

In FIGS. 4A to 4D, when the voltage generation signals S1 and S2 are H levels, the driving signal T1 is the L level, and the driving signal T2 is the H level, the ground voltage is supplied to the terminal for the VS1. The NMOS 41 and the PMOS 51 become in the conductive state and the PMOS 33 becomes in the non-conductive state. Since the voltage according to the input voltage from the input terminal Vin supplied from the input voltage VC4 is supplied to one electrode and the other electrode becomes the ground, the capacitor according to the input voltage is charged.

Next, when the voltage generation signals S1 and S2 are L levels, the driving signal T1 is the H level, and the driving signal T2 is the L level, the input voltage is supplied to the terminal for the VS1. The NMOS 41 and the PMOS 51 become in the non-conductive state and the PMOS 33 becomes in the conductive state. Since the input voltage is maintained in one electrode of the capacitor and the input voltage is supplied to the other electrode, the capacitor is started to be discharged. Thereby, a voltage is boosted for a charge in which a voltage on one electrode side is stoked. If the stocked charge corresponds to the input voltage, the input voltage is boosted double. The boosted voltage is supplied to the output terminal Vout electrically connected to the terminal VC6. By this way, a voltage in which the input voltage is boosted double can be obtained. The boosted voltage is stably maintained by repeating like this operation.

In FIGS. 4A to 4D, each of the driving signals T1 and T2 has a period of the H level is because a desired boost voltage is surely realized by maintaining a voltage level of one electrode in the capacitor at the input voltage or a boost voltage in a description later at a time of discharge of the capacitor. Further, that is because a charge time is accelerated and charge for desired charge can surely be made by starting charge based on a boost voltage at a time of charging the capacitor.

Figure 2B:
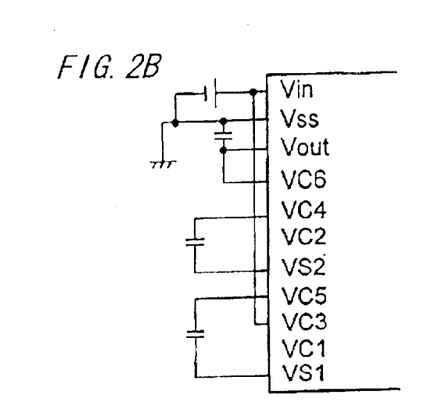

In FIG. 2B, the capacitor is newly connected between the terminal VC4 and the terminal for the signal VS2 due to the boost voltage at third times and the capacitor is provided the outside, so that the connection in FIG. 2B is different from the connection in FIG. 2A. The input terminal Vin connected to the terminal VC4 is connected to the terminal VC3.

By performing like this connection, since the terminal VC3 establishes the same function as the input terminal Vin, only the NMOS transistors 41 and 43, and the PMOS transistors 33, 51 and contributes to the boost operation.

As an operation, when the voltage generation signals S1 and S2 are L levels, the driving signal T1 is the H level, and the driving signal T2 is the L level, the voltage according to the input voltage is supplied to the terminal for the VS1. The ground voltage is supplied to the terminal for the VS2. The NMOS transistors 41 and 51 become in the non-conductive state, and the PMOS 33, NMOS 43 and the PMOS 53 become in the conductive state. Since the voltage according to the input voltage from the input terminal Vin supplied from the input voltage VC3 is supplied to one electrode and the other electrode becomes the ground, the capacitor connected to the terminal VC4 is charged according to the input voltage.

When the voltage generation signals S1 and S2 are H levels, the driving signal T1 is the L level, and the driving signal T2 is the H level, the ground voltage is supplied to the terminal for the VS1. The voltage according to the input voltage is supplied to the terminal for the VS2. The NMOS 41 and the PMOS 51 become in the conductive state, and the PMOS 33, the NMOS 43, and the PMOS 53 become in the non-conductive state. Thereby, the capacitor connected to the terminal VC4 is started to be discharged, the voltage of the terminal VC4 is boosted, and the capacitor connected to the terminal VC5 is charged.

When the voltage generation signals S1 and S2 are L levels, the driving signal T1 is the H level, and the driving signal T2 is the L level, the voltage according to the input voltage is supplied to the terminal for the VS1. The ground voltage is supplied to the terminal for the VS2. The NMOS 41 and the PMOS 51 become in the non-conductive state, and the PMOS 33, the NMOS 43, and the PMOS 53 become in the conductive state. The capacitor connected to the terminal VC5 is started to be discharged. At this time, the terminal VC5 is a voltage boosted double by discharge of the capacitor connected to the terminal VC4 and thereby the voltage becomes the boosted voltage to which a voltage for the discharged charge added to this voltage. If the charge stocked in the capacitor connected to the terminal VC5 corresponds to the input voltage, a voltage in which the input voltage is boosted at third times can be obtained. The boosted voltage is supplied to the output terminal Vout via the PMOS 33.

Figure 2C:
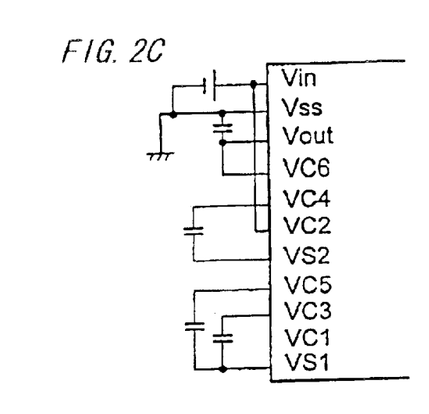

Similarly, the terminal VC2 is connected to the input terminal Vin in FIG. 2C, the connected capacitor is provided in FIG. 2B and, further, a capacitor is provided between the terminal VC3 and the terminal for the VS1. This allows the voltage to be boosted at fourth times. As the operation, the gradual boost voltage for the input voltage is sequentially performed by each capacitor while charge and discharge of the capacitor are alternately repeated similar to FIG. 2A or 2B, the desired boosted voltage is generated while the boosted voltage is added. Thereby, the boost voltage at fourth times is obtained.

Figure 2D:
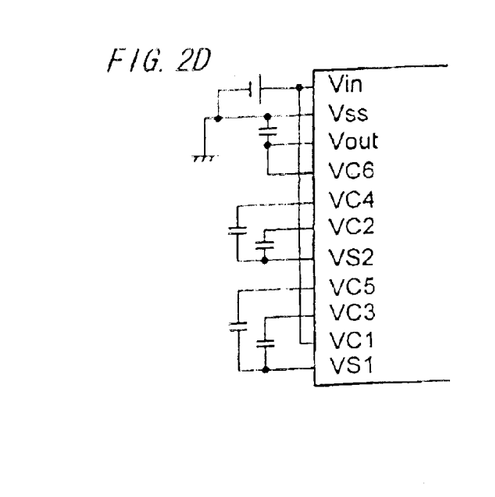

The terminal VC1 is connected to the input terminal Vin in FIG. 2D, the connected capacitor is provided in FIG. 2C and, further, a capacitor is provided between the terminal VC2 and the terminal for the VS2. This allows the voltage to be boosted fourth times.

Figure 2E:
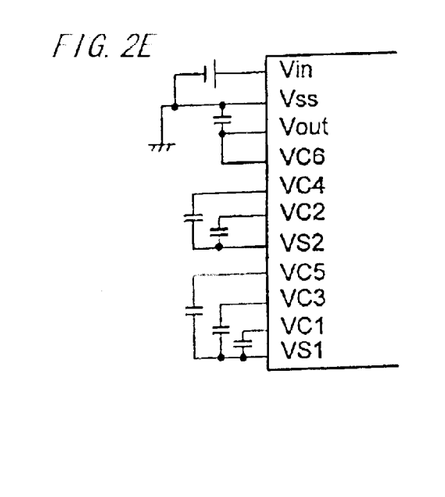

In contrast to FIG. 2D, the input terminal Vin is not connected to another terminal in FIG. 2E and, further, a new capacitor is provided between the terminal VC1 and the terminal VS1. This allows the voltage to be boosted sixth times.

Figure 2F:
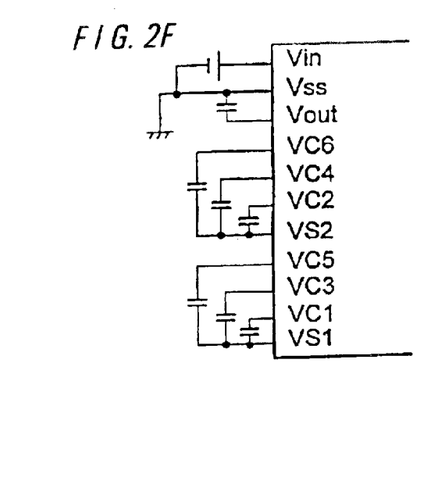

In contrast to FIG. 2E, further a new capacitor is provided between the terminal VC2 and the terminal VS2 in FIG. 2F. This allows the voltage to be boosted at seventh times.

Based on a timing chart shown in FIGS. 4A to 4D, a desired boost voltage is obtained by sequentially boosting the voltage while a different operation so that one capacitor is charged and the other of adjacent capacitors is discharged is repeated. An operation is not changed greatly in the boost circuit of any multiple.

Next, an operation in a case of starting the boost circuit will be described. When a power supply is turned on, the voltage level of the output signal from each inverter shown in FIG. 1 is the L level and any of the NMOS transistors are in the non-conductive state. However, the PMOS transistors are provided corresponding to the NMOS transistors in the boost circuit of the present invention. Since the PMOS can be in the conductive state at the L level of the voltage level of the output signal in the inverter, the input voltage input from the input terminal Vin can be supplied to the output terminal Vout. Thereby, each inverter co which the output voltage from the output terminal Vout is supplied and the NOR gate are activated. Normal starting of the boost voltage circuit becomes possible.

Since operational control for the PMOS is usually performed similar to the NMOS at a time of operation in the boost circuit of the present invention, an error operation does not occur and a consumption current is not increased. Since the PMOS can be produced at the same time of the other transistor in producing the MOS transistor, increase of a produce step or the mask can be reduced, reduction of the cost can be expected. As aforementioned above, since a generation operation of the boost voltage can be controlled by the activation signal CN, a waste operation can be reduced. Therefore, the PMOS is preferable for the semiconductor device for which a low consumption current is required.

If the boost circuit of the present invention is applied for a semiconductor, a voltage can easily become a desired boost voltage by obtaining stability at a time of start and connecting the capacitor to the external terminal on the user end.

As mentioned above, stability can surely improved at the time of start in the boost circuit in the first embodiment of the present embodiment. Since it is not necessary to use a depression typed transistor, the consumption current can be reduced and an increased cost with increasing the manufacturing step can be reduced.

Figure 5:
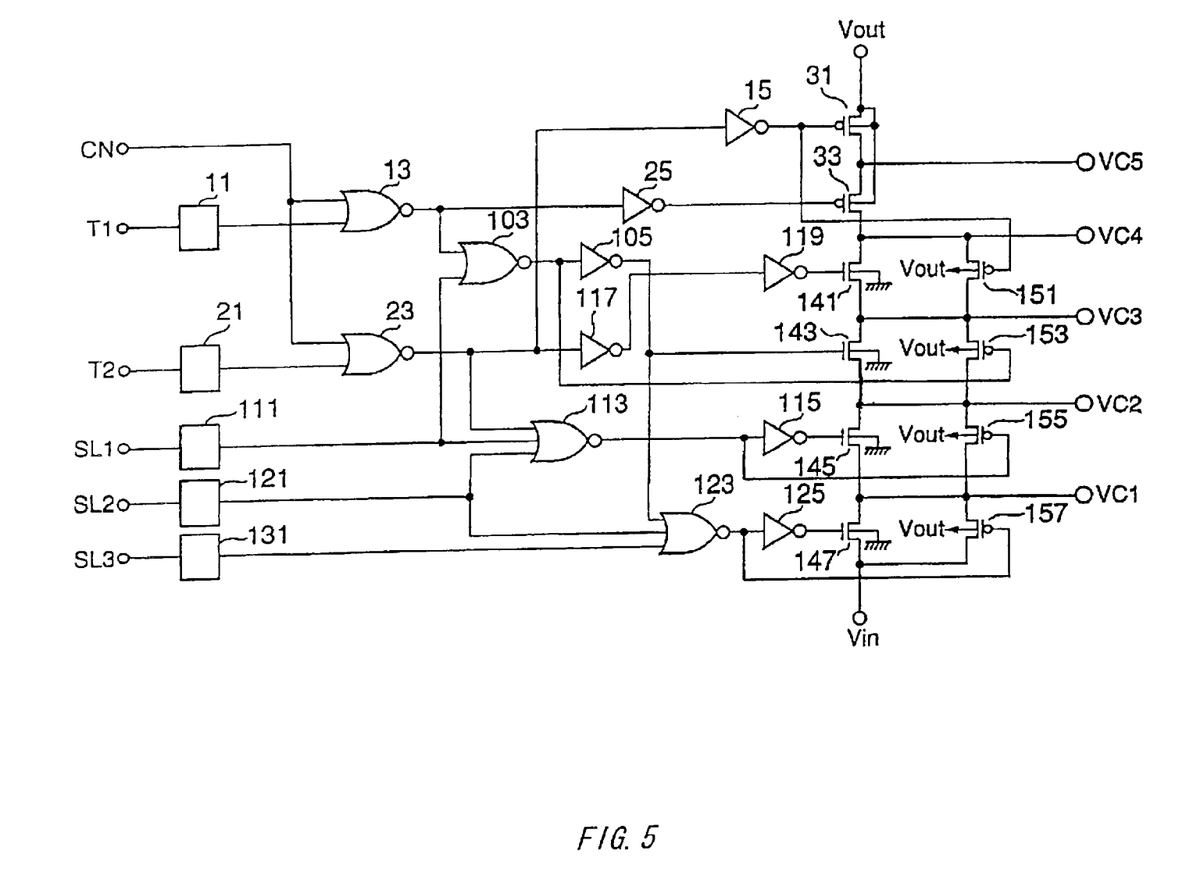
FIG. 5 is a circuit diagram of a voltage booster circuit according to a second embodiment of the present invention.

Next, a boost circuit in a second embodiment of the present invention will be described. FIG. 5 is a circuit diagram of the boost circuit in the second embodiment of the present invention. To simplified explanatory, the same reference denotes for the same constitution as FIG. 1. Further, to simplified explanatory, although one NMOS and one PMOS are deleted from FIG. 1, the NMOS and the PMOS in FIG. 5 may be the same as ones of FIG. 1. The NMOS transistors 141, 143, 145 and 147 are connected between the output terminal Vout and the input terminal Vin in series similar to the NMOS transistors in FIG. 1 and the PMOS transistors 151, 153, 155 and 157 are respectively connected to the corresponding NMOS transistors in parallel.

A feature in FIG. 5 is that level shift circuits to shift levels on the high voltage side of the selection signals SL1 to SL3 are provided and NOR gates 103, 113 and 123 are added. Since newly added NOR gates 103, 113 and 123 of inverters provided in FIG. 1 similarly function, one part is replaced. Therefore, the NMOS and the PMOS are deleted.

Each of level shift circuits 111, 121 and 131 shifts a voltage level on a high voltage side of each of selection signals SL1 to SL3 transmitted between a voltage source level (or internal voltage level) and a ground voltage level, from the voltage source level (or internal voltage source level) to a boost voltage level. An output voltage from the output terminal Vout is supplied to the level shift circuits 111, 121 and 131.

An output signal from the shift level circuit 111 and an output signal from the NOR gate 13 are input to the NOR gate 103. The output signal of the NOR gate 103 is supplied to a gate electrode of the PMOS 153 and to a gate electrode of the NMOS 143 via an inverter 105.

The output signals of the level shift circuits 111 and 121 and the output signal of the NOR gate 23 are input to the NOR gate 113. The output signal of the NOR gate 113 is supplied to a gate electrode of the PMOS 155 and a gate electrode of the NMOS 145 via the inverter 115.

The output signals of the level shift circuits 121 and 131 and the output signal of the inverter 105 are input to the NOR gate 123. The output signal of the NOR gate 123 is supplied to a gate electrode of the PMOS 157 and to a gate electrode of the NMOS 147 via the inverter 125.

The output signal of the NOR gate. 23 is supplied to a gate electrode of the NMOS 141 via the inverters 117 and 119 and to the PMOS 151 via the inverter 15. The output voltage from the output terminal Vout is supplied so that high voltage level of each NOR gate and each inverter corresponds to the output voltage from the Vout.

In the boost voltage circuit like this constitution, a position to supply the input voltage of the input terminal Vin can be changed by the selection signals SL1 to SL3.

For example, when the boost voltage at three times is required, the capacitors respectively connects to the terminal VC5 and the terminal VC4 and the input voltage is supplied to the terminal VC3. In the first embodiment, as shown in FIG. 2B, though the input terminal Vin and the terminal VC3 are connected with a wire, the wire is required to be arranged so that the wire crosses the other wire (e.g., wire to connect the terminal VC4 to the capacitor or wire to electrically connect the terminal VC6 to the output terminal Vout). Therefore, a substrate to mount the semiconductor is multiple to provide the wire or an extra are for the substrate due to bypass is required. As a result, it is necessary to be large the substrate itself in size.

In FIG. 5, realization for the circuit can be established by the selection signal. In a case of the above example, the selection signal SL1 is H level and the selection signals SL2 and SL3 are L levels. Each of the voltage levels of the output signals in the NOR gates 103 and 113 is fixed to the L level. The voltage level of the output signal of the NOR gate 123 input via the inverter 105 is fixed to the L level. Since the NMOS transistors 143, 145 and 147 and the PMOS transistors 153, 155 and 157 become in the conductive state, the input voltage from the input terminal Vin is transmitted to the terminal VC3. Since the PMOS is connected in parallel even if a signal to make the NMOS 153, 155 and 157 be in the conductive state (signal from inverter) prior to boosted of the voltage is approximately a voltage source, the input voltage can be supplied to the terminal VC3 even with an initial state without reduction of a threshold voltage of the NMOS for three stages. Thereby, a boost voltage operation with a high speed can be started.

Similarly, when the selection signal SL2 is the H level and each of the selection signals SL1 and SL3 is the L level, the input voltage of the input terminal Vin can be transmitted to the terminal VC2. Therefore, the same effect as the above can be obtained at a time of the boost voltage at the fourth times. When the selection signal SL3 is the H level and each of the selection signals SL1 and SL2 is the L level, the input voltage of the input terminal Vin can be transmitted to the terminal VC1. Therefore, the same effect as the above can be obtained at a time of the boost voltage at the fifth times.

By using a boost voltage circuit in a second embodiment, the same effect as a first embodiment can be obtained. The boost voltage level is set and complication is reduced in connect-wiring the capacitor provided the outside and thereby a desired boost voltage level easily can be set in the semiconductor in which the boost voltage circuit is incorporated. Therefore, a substrate can be miniatured for deletion of wiring at the outside.

As mentioned above, the boost voltage circuit and the semiconductor in which the boost voltage circuit is incorporated have been described, however, a constitution of the present invention is not limited to this.

For example, the constitution is that five NOMS transistors are connected in series in the first embodiment as an example in which the voltage is boosted at seventh times, however, this is not limited and the number of NMOS series connections may be farther increased to realize multiple boost voltage over seventh times. To obtain the effect of the present invention, it is necessary to provide the PMOS in parallel for each NMOS. n NMOS transistors and n PMOS transistors (n should be one or more integers) can be provided in the boost circuit of the present invention.

In the second embodiment, when a case where wiring is crossed is further increased with increasing multiple of the boost voltage, modification is further available to obtain the same effect as the second embodiment by increasing the selection signal. If the case where wiring is crossed occurs, the case is a case where two or more NMOS transistors are connected in series, therefore, the effect can be obtained in a case where the number of selection signals is lesser than the number of NMOS transistors.

In the present invention, since the voltage is boosted to the positive voltage side, the PMOS is provided in parallel to he NMOS connected in series. However, when the voltage is boosted to the negative voltage side (voltage level is fallen), the NMOS may be provided in parallel to the PMOS connected in series.

Relation of the NOR gate to the inverter in each embodiment is not limited to the above embodiment and a control circuit may be comprised by using the OR gate or the AND gate, if the conductive state of the NMOS or the PMOS can be controlled by a similar logic.

The boost voltage circuit of the present invention and the semiconductor in which the boost voltage circuit is incorporated can be modified in various manners in a scope of the present invention.

The boost voltage circuit to improve stability in starting without increase of consumption current, in the present invention can be provided.

The cost is extremely reduced and the above effect can be obtained in the boost voltage circuit of the present invention.

The boost voltage circuit of the present invention is incorporated into the semiconductor device and thereby the semiconductor device capable of easily obtaining any boost voltages with the extreme low cost can be provided.

Although the present invention has been described by way of exemplary embodiments, it should be understood that those skilled in the art might make many changes and substitutions without departing from the spirit and the scope of the present invention which is defined only by the appended claims.

What is claimed is:

1. A semiconductor device comprising:

a plurality of first terminals for respective capacitor connections;

a second terminal for supplying a power supply voltage;

a third terminal for supply a ground voltage; and a voltage booster circuit electrically connecting said first, second and third terminals, the voltage booster circuit boosts an input voltage by using a capacitor and generates a boosted voltage higher than said input voltage, the voltage booster circuit having an input terminal at which the input voltage is applied, an output terminal at which the boosted voltage is outputted, a plurality of N channel transistors electrically connected in series between said input terminal and said output terminal, a plurality of first P channel transistors each of which electrically connected with corresponding ones of said plurality of N channel transistors in parallel, and a controlling circuit that outputs control signals each of which controlling a conductive state of corresponding ones of said N channel transistors and corresponding ones of said P channel transistors, wherein the plurality of first terminals are respectively electrically connected to first electrodes of corresponding ones of said N channel transistors and first electrodes of corresponding ones of said first P channel transistors corresponding to said corresponding one of N channel transistors, wherein each of said N channel transistors is controlled to be in a conductive state different from a conductive state of an adjacent one of said N channel transistors, by said control signals, and wherein each of said P channel transistors is controlled to be in a conductive state corresponding to the conductive state of a corresponding one of said N channel transistors electrically connected thereto in parallel, by said control signals.

2. The semiconductor device as claimed in claim 1, the boosted voltage generated by the voltage booster circuit is used as a power supply voltage for a liquid crystal display.

3. The semiconductor device as claimed in claim 2, further comprising:

a voltage supplying circuit which outputs first and second voltages, the first and second voltages have substantively complementary voltage levels with respect to each other, and a plurality of fourth terminals each of which receiving one of the first and second voltages, wherein each of a plurality of capacitors are respectively electrically connected between one of the first terminals and one of the fourth terminals.

4. The semiconductor device as claimed in claim 1, the voltage booster circuit further comprising an activation circuit that sets a voltage level of the control signals so that said N channel transistors and said first P channel transistors are set in a non-conductive state according to an activation signal.

5. The semiconductor device as claimed in claim 1, wherein the controlling circuit comprises:

a fixing circuit that fixes a voltage level of a control signal supplied to a gate electrode of a corresponding one of said N channel transistors and a gate electrode of a corresponding one of said first P channel transistors which is connected to the corresponding one of said N channel transistors, according to selection signals input thereto.

6. The semiconductor device as claimed in claim 1, the voltage booster circuit further comprising a second P channel transistor connected in series between said output terminal and one of said N channel transistors, having a conductive state controlled by said controlling circuit.

7. The semiconductor device as claimed in claim 1, further comprising:

a voltage supply circuit which outputs first and second voltages, the first and second voltages have substantively complementary voltage levels with respect to each other; and a plurality of fourth terminals each of which receiving one of the first and second voltages, wherein each of a plurality of capacitors are respectively electrically connected between one of the first terminals and one of the fourth terminals.

* * * * *